United States Patent
Heo

(10) Patent No.: US 9,905,890 B2
(45) Date of Patent: Feb. 27, 2018

(54) RECHARGEABLE BATTERY HAVING LABEL FILM, METHOD FOR MANUFACTURING RECHARGEABLE BATTERY, AND METHOD FOR MANUFACTURING LABEL FILM FOR RECHARGEABLE BATTERY

(71) Applicant: Samsung SDI Co., Ltd., Yongin-si, Gyeonggi-do (KR)

(72) Inventor: Sang-Do Heo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 90 days.

(21) Appl. No.: 14/975,559

(22) Filed: Dec. 18, 2015

(65) Prior Publication Data
US 2016/0365609 A1    Dec. 15, 2016

(30) Foreign Application Priority Data
Jun. 11, 2015 (KR) .................. 10-2015-0082784

(51) Int. Cl.
| | |
|---|---|
| *H01M 2/02* | (2006.01) |
| *H01M 4/82* | (2006.01) |
| *H01M 6/00* | (2006.01) |
| *H01M 10/42* | (2006.01) |
| *H01M 10/48* | (2006.01) |
| *H01M 2/34* | (2006.01) |

(52) U.S. Cl.
CPC ....... *H01M 10/425* (2013.01); *H01M 10/488* (2013.01); *H01M 2/344* (2013.01); *H01M 2220/30* (2013.01)

(58) Field of Classification Search
CPC .... H01M 2/02; H01M 2/0202; H01M 2/0257; H01M 10/425
See application file for complete search history.

(56) References Cited

U.S. PATENT DOCUMENTS

| | | | |
|---|---|---|---|
| 8,810,375 B2 | 8/2014 | Koyama | |
| 2003/0136503 A1* | 7/2003 | Green | B32B 38/0004 156/264 |
| 2007/0008141 A1* | 1/2007 | Sweetland | G06K 17/00 340/572.7 |
| 2008/0254359 A1* | 10/2008 | Byun | H01M 10/46 429/163 |

FOREIGN PATENT DOCUMENTS

| | | |
|---|---|---|
| KR | 10-2009-0024754 A | 3/2009 |
| KR | 10-2014-0056606 A | 5/2014 |
| KR | 10-2014-0110175 A | 9/2014 |

* cited by examiner

*Primary Examiner* — Ula C Ruddock
*Assistant Examiner* — Julian Anthony
(74) *Attorney, Agent, or Firm* — Knobbe Martens Olson & Bear LLP

(57) ABSTRACT

The present invention relates to a rechargeable battery with a label film, a method for manufacturing a rechargeable battery, and a method for manufacturing a label film for a rechargeable battery. Regarding a rechargeable battery with a label film attached to a case, the label film includes a film base, an antenna pattern formed on a first side of the film base, and an information layer formed on a second side of the film base and on which a character including information on the rechargeable battery is written.

15 Claims, 11 Drawing Sheets

RECHARGEABLE BATTERY HAVING LABEL FILM, METHOD FOR MANUFACTURING RECHARGEABLE BATTERY, AND METHOD FOR MANUFACTURING LABEL FILM FOR RECHARGEABLE BATTERY

RELATED APPLICATIONS

This application claims priority to and the benefit of Korean Patent Application No. 10-2015-0082784 filed in the Korean Intellectual Property Office on Jun. 11, 2015, the entire contents of which are incorporated herein by reference.

BACKGROUND

Field

The present invention relates to a rechargeable battery with a label film, a method for manufacturing a rechargeable battery, and a method for manufacturing a label film for a rechargeable battery.

Description of the Related Art

A rechargeable battery is a battery that can be charged and discharged, unlike a primary battery that cannot be recharged. A low-capacity rechargeable battery has been used for small portable electronic devices, such as a mobile phone, a laptop computer, and a camcorder, and a large-capacity battery has been widely used as a power supply for driving a motor such as for a hybrid car.

As typical rechargeable batteries, there are a nickel-cadmium (Ni—Cd) battery, a nickel-metal hydride (Ni-MH) battery, a lithium (Li) battery, a lithium ion (Li-ion) battery, etc. Particularly, the lithium ion rechargeable battery has an operating voltage about thrice as high as that of the Ni—Cd battery or Ni-MH battery that is widely used as a power supply for electronic devices. In addition, the lithium ion rechargeable battery has been widely used because its energy density per unit weight is high.

In the rechargeable battery, a lithium-based oxide has been used as a positive active material, and a carbon material has been used as a negative active material. Generally, batteries are classified into a liquid electrolyte battery and a polymer electrolyte battery depending on the type of electrolyte, and lithium batteries using a liquid electrolyte are called lithium ion batteries while batteries using a polymer electrolyte are called lithium polymer batteries.

An RFID antenna for radio communication is installed in a smartphone, and it is expensive and involves a complicated process to manufacture the antenna and install the same.

The above information disclosed in this Background section is only for enhancement of understanding of the background of the invention and therefore it may contain information that does not form the prior art that is already known in this country to a person of ordinary skill in the art.

SUMMARY OF CERTAIN INVENTIVE ASPECTS

The present invention has been made in an effort to provide a rechargeable battery having a label film, a method for manufacturing a rechargeable battery, and a method for manufacturing a label film for a rechargeable battery.

An exemplary embodiment of the present invention provides a rechargeable battery with a label film attached to a case, wherein the label film includes a film base, an antenna pattern formed on a first side of the film base, and an information layer formed on a second side of the film base and on which a character including information on the rechargeable battery is written.

The second side may be attached to the case and contact the case, and the antenna pattern may be made of a conductive ink formed by printing.

The antenna pattern may include an antenna portion rotated and extended toward an internal side from an external side, an external terminal connected to an external end of the antenna portion, and an internal terminal connected to an internal end of the antenna portion, and an insulating layer may be formed between the internal terminal and the antenna portion.

A shield film made of ferrite may be attached to the antenna pattern, the internal terminal and the external terminal may be exposed outside the shield film, and an access terminal connected to the antenna pattern may be formed on an external side of the case.

The internal terminal and the external terminal may be connected to the access terminal with a conductive adhesive as a medium, and the antenna pattern may be used as a near field communication (NFC) antenna.

Another embodiment of the present invention provides a method for manufacturing a rechargeable battery with a label film, including: printing an antenna pattern on a first side of a film base by using a conductive ink to perform a first printing; printing an insulating layer on the antenna pattern to perform a second printing; printing an internal terminal connected to an internal end portion of the antenna pattern and formed to pass over the insulating layer to perform a third printing; attaching a shield film for covering the antenna pattern to attach a shield film; and attaching the label film to a case.

The first printing may include printing an antenna portion wound toward an internal side from an external side and an external terminal connected to an external end of the antenna portion.

The attaching of a case may include electrically connecting the external terminal and the internal terminal to an access terminal formed on an external side of the case.

The first printing, the second printing, and the third printing may be performed according to a rotary printing scheme, and the method may further include printing an information layer on which a character including information on a rechargeable battery is written on a second side of the film base to print information.

Yet another embodiment of the present invention provides a method for manufacturing a label film attached to a case of a rechargeable battery, including: printing an antenna pattern on a first side of a film base by using a conductive ink to perform a first printing; printing an insulating layer on the antenna pattern to perform a second printing; printing an internal terminal connected to an internal end portion of the antenna pattern and formed to pass over the insulating layer to perform third printing; and attaching a shield film for covering the antenna pattern.

The method may further include printing an information layer on which a character including information on a rechargeable battery is written on a second side of the film base to print information.

According to the embodiments of the present invention, the antenna is formed on the label tape and is attached to the case so that the RFID antenna may be easily installed in the rechargeable battery.

DETAILED DESCRIPTION OF CERTAIN INVENTIVE EMBODIMENTS

Figure 1:
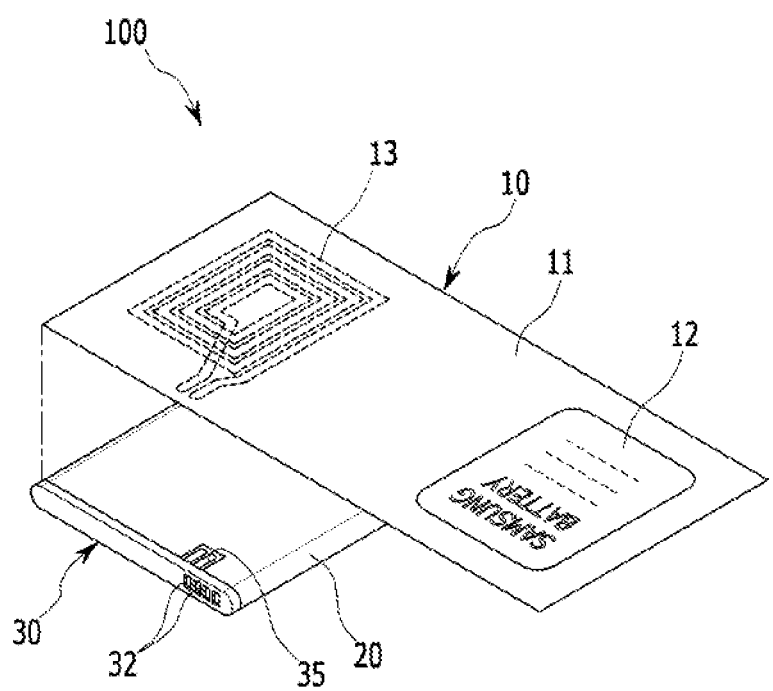
FIG. 1 shows an exploded perspective view of a rechargeable battery according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Like reference numerals designate like elements throughout the specification and the drawings.

FIG. 1 shows an exploded perspective view of a rechargeable battery according to an exemplary embodiment of the present invention.

Referring to FIG. 1, the rechargeable battery 100 includes a case 20 in which an electrode assembly is provided, a protective circuit module 30 combined to the case 20 and in which a circuit element is installed, and a label film 10 attached to an external side of the case 20. The rechargeable battery 100 may be formed as a lithium ion battery or a lithium polymer battery. The present invention is not limited thereto, and the rechargeable battery 100 may be formed with various types of batteries that are discharged.

The case 20 may be formed in a prismatic shape and may be configured to be cylindrical. An electrode assembly including a positive electrode, a negative electrode, and a separator is installed in the case 20.

The protective circuit module 30 is combined to one end portion of the case 20, and includes a circuit board and a circuit element installed on the circuit board. The circuit element controls charging and discharging of the rechargeable battery 100. A drawn-out terminal 32 connected to the electrode assembly is provided in the protective circuit module 30.

Figure 7:
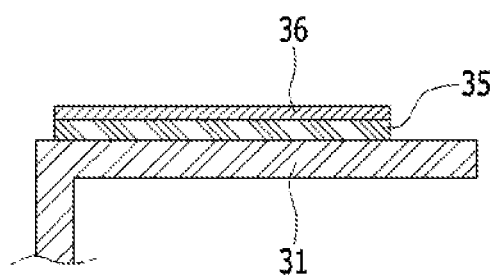
FIG. 7 shows a cross-sectional view of an antenna terminal according to an exemplary embodiment of the present invention.

An access terminal 35 connected to an antenna pattern is formed on an external side of the case 20. As shown in FIG. 7, the access terminal 35 is formed on a flexible printed circuit board (FPCB) 31 connected to the protective circuit module 30. A conductive adhesive 36 is coated on the access terminal 35 so the access terminal 35 is connected to the antenna pattern 13 with the conductive adhesive 36 as a medium.

Figure 2:
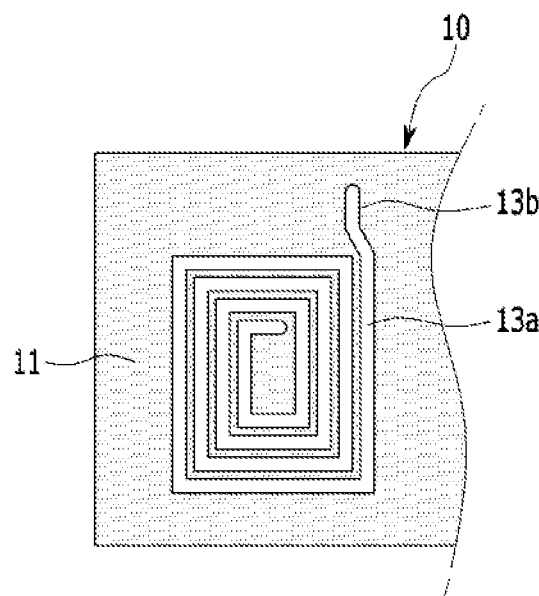
FIG. 2 shows a top plan view of a state in which an antenna portion and an external terminal are formed on a label film according to an exemplary embodiment of the present invention.

FIG. 2 shows a top plan view of a state in which an antenna portion and an external terminal are formed on a label film according to an exemplary embodiment of the present invention.

Referring to FIG. 1 and FIG. 2, the label film 10 includes a film base 11, an antenna pattern 13 formed on a first side 11a of the film base 11, and an information layer 12 formed on a second side 11b of the film base 11 and on which a character including information on the rechargeable battery 100 is written.

Figure 6A:
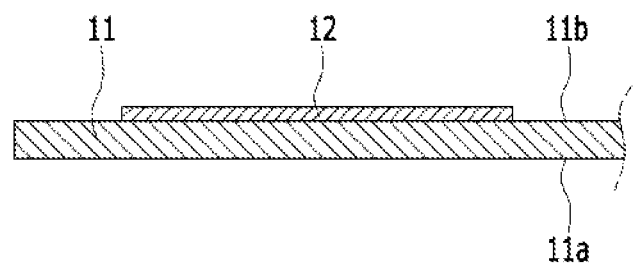
FIG. 6A shows a cross-sectional view of a state in which an information layer is formed on a label film according to an exemplary embodiment of the present invention.

As shown in FIG. 6A, the film base 11 includes the first side 11a attached to the case 20 and the second side 11b provided in an opposite side of the first side 11a. The first side 11a becomes an internal side attached to the case 20 and contacting the case 20, and the second side 11b becomes an external side exposed toward the outside. The film base 11 is made of a polymer and may be formed of polypropylene, polyethylene, or a polyethylene terephthalate.

Figure 3:
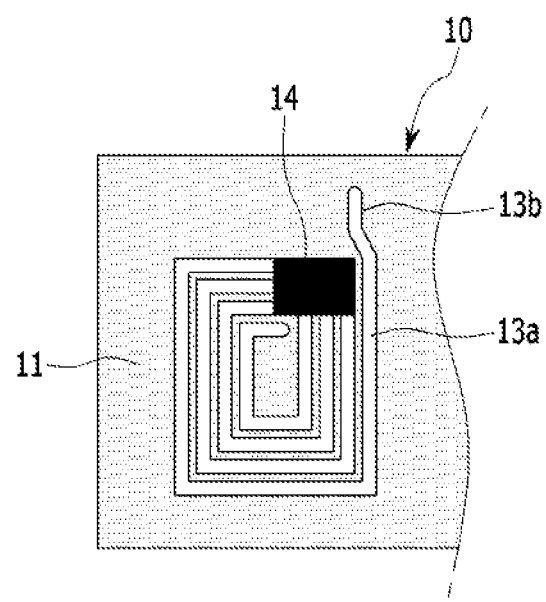
FIG. 3 shows a top plan view of a state in which an insulating layer is formed on a label film according to an exemplary embodiment of the present invention.
Figure 4:
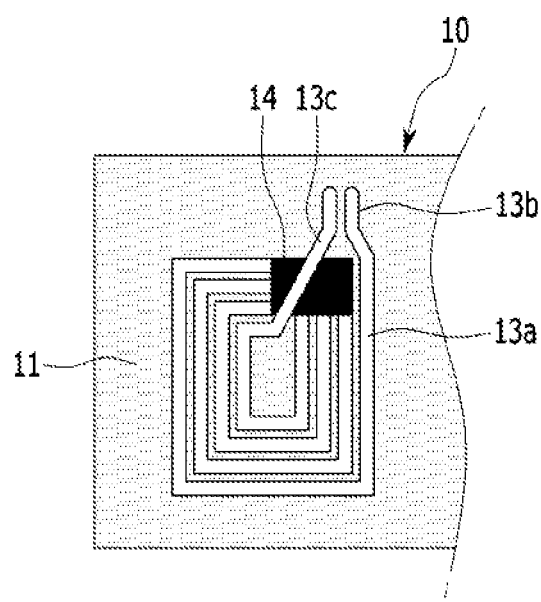
FIG. 4 shows a top plan view of a state in which an internal terminal is formed on a label film according to an exemplary embodiment of the present invention.

FIG. 3 shows a top plan view of a state in which an insulating layer is formed on a label film according to an exemplary embodiment of the present invention, and FIG. 4 shows a top plan view of a state in which an internal terminal is formed on a label film according to an exemplary embodiment of the present invention.

As shown in FIG. 3 and FIG. 4, an antenna pattern 13 is formed on the first side 11a, and the antenna pattern 13 includes an antenna portion 13a wound toward the inside from the outside, an external terminal 13b connected to an external end of the antenna portion 13a, and an internal terminal 13c connected to an internal end of the antenna portion 13a. The antenna pattern 13 may be formed by printing and is made of a conductive ink.

The antenna portion 13a is formed of a line rotating to the inside from the outside and extending, and it is substantially disposed in a rectangular and spiral shape. The present invention is not limited thereto, and the antenna portion 13a may be alternately disposed or may be disposed circularly spirally.

The external terminal 13b is connected to an external end portion of the antenna portion 13a and is protruded to an upper portion of the antenna portion 13a. The internal terminal 13c is connected to the internal end portion of the antenna portion 13a and is protruded to the upper portion of the antenna portion 13a. Upper portions of the external terminal 13b and the internal terminal 13c are disposed to neighbor each other in parallel.

An insulating layer 14 is formed between the internal terminal 13c and the antenna portion 13a, and the insulating layer 14 is formed by a printing method and is formed to cover a corner of one side of the antenna portion 13a. The insulating layer 14 may be desirably formed to reach an edge of the antenna portion 13a from the internal end portion of the antenna portion 13a, thereby preventing deterioration of a receiving rate by multiple connections of the internal terminal 13c and the antenna portion 13a.

Figure 5:
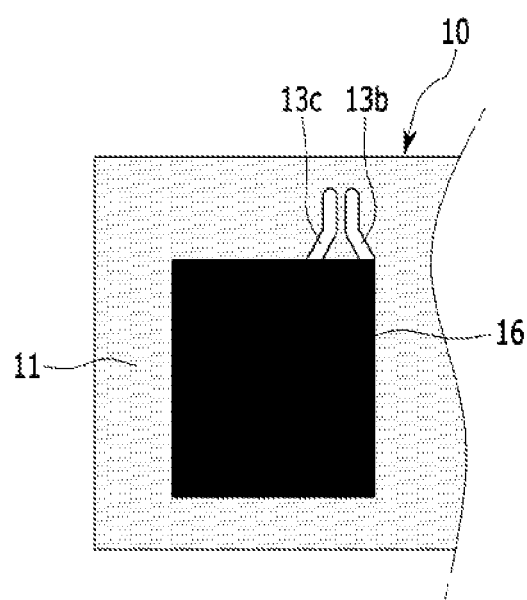
FIG. 5 shows a top plan view of a state in which a shield film is attached to a label film according to an exemplary embodiment of the present invention.

FIG. 5 shows a top plan view of a state in which a shield film is attached to a label film according to an exemplary embodiment of the present invention.

As shown in FIG. 5, the shield film 16 made of ferrite is attached to the antenna portion 13a, and part of the internal terminal 13c and the external terminal 13b are not covered by the shield film 16 but are exposed.

When the label film 10 is attached to the case 20, the internal terminal 13c and the external terminal 13b are electrically connected to the access terminal 35, and the antenna portion 13a is electromagnetically intercepted from the case 20 by the shield film 16. The internal terminal 13c and the external terminal 13b are attached to the access terminal with a conductive adhesive 36 as a medium.

As shown in FIG. 1, an information layer 12 on which characters are printed is formed on the second side 11b of the film base 11, and the information layer 12 includes information on the rechargeable battery 100. The information on the rechargeable battery 100 includes information on a voltage, a current, a manufacturing date, and a manufacturer of the rechargeable battery.

According to the present exemplary embodiment, the antenna pattern 13 is formed on the label film 10 to reduce cost and the process for installing the antenna may be eliminated to improve productivity.

A method for manufacturing a rechargeable battery with a label film will now be described.

The method for manufacturing a rechargeable battery with a label film according to the present exemplary embodiment includes printing information, performing first printing, performing second printing, performing third printing, attaching a shield film, and attaching a case.

As shown in FIG. 1 and FIG. 6A, the printing of information includes forming an information layer 12 on which a character is printed on a second side 11b of the film base 11. The information layer 12 includes information on a voltage, a current, a manufacturing date, and a manufacturer of the rechargeable battery. The printing of information may be performed prior to the performing of a first printing, and may be performed after the performing of a third printing.

Figure 6B:
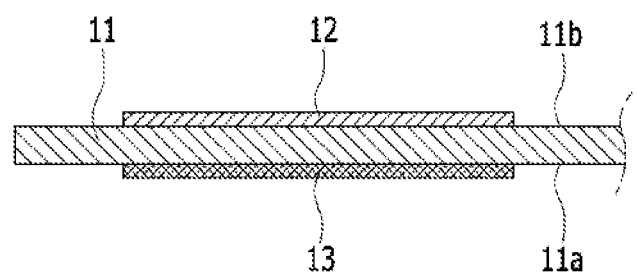
FIG. 6B shows a top plan view of a state in which an antenna portion and an external terminal are formed on a label film according to an exemplary embodiment of the present invention.

As shown in FIG. 2 and FIG. 6B, the performing of a first printing includes printing an antenna pattern by using a conductive ink on a first side of a film base. The performing of a first printing includes printing a conductive ink on the film base 11 according to a rotary printing scheme, and includes printing an antenna portion 13a wound toward an internal side from an external side and an external terminal 13b connected to an external end of the antenna portion 13a.

Figure 6C:
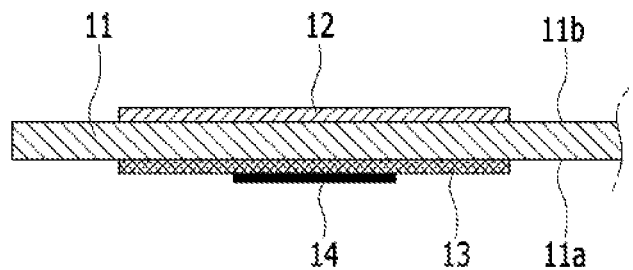
FIG. 6C shows a top plan view of a state in which an insulating layer is formed on a label film according to an exemplary embodiment of the present invention.

As shown in FIG. 3 and FIG. 6C, the performing of the second printing includes printing an insulating layer 14 on an antenna pattern 13. The insulating layer 14 is made of a polymer material and has an electrical insulation property. The insulating layer 14 is formed according to the rotary printing scheme, and is formed to cover a corner of one side of the antenna portion 13a. The insulating layer 14 may be desirably formed to reach the antenna portion 13a from an internal end portion of the antenna portion 13a.

Figure 6D:
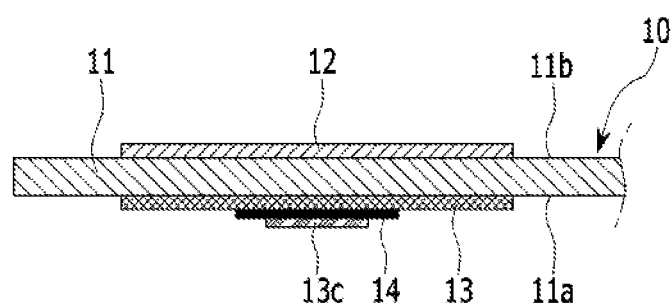
FIG. 6D shows a top plan view of a state in which an internal terminal is formed on a label film according to an exemplary embodiment of the present invention.

As shown in FIG. 4 and FIG. 6D, the third printing includes printing an internal terminal 13c connected to an internal end portion of the antenna pattern 13 and formed to pass over the insulating layer 14.

Figure 6E:
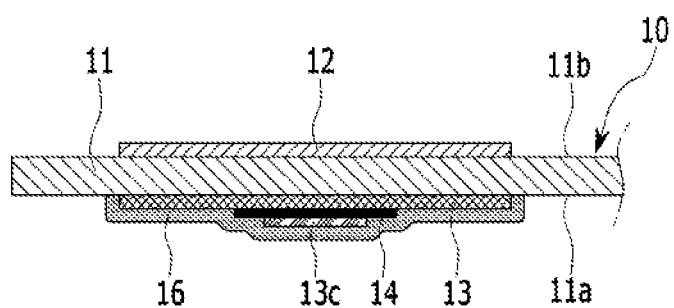
FIG. 6E shows a cross-sectional view of a state in which a shield film is attached to a label film according to an exemplary embodiment of the present invention.

As shown in FIG. 5 and FIG. 6E, the attaching of a shield film includes attaching a shield film 16 for covering the antenna pattern 13. The shield film 16 is made of ferrite and is installed to cover the antenna portion 13a. Part of the internal terminal 13c and the external terminal 13b are not covered by the shield film 16 but are exposed.

As shown in FIG. 1, the attaching of a case includes attaching the label film 10 to an external side of the case 20 so that a first side 11a may face the case 20. The attaching of a case includes electrically connecting the external terminal 13b and the internal terminal 13c to the access terminal 35 formed on the external side of the case 20 with a conductive adhesive 36 as a medium.

The method for manufacturing a label film according to an exemplary embodiment of the present invention includes: printing an information layer on which a character including information on the rechargeable battery 100 is written on a second side 11b of the film base 11 to thus print information; printing an antenna pattern 13 on a first side 11a of the film base 11 by using a conductive ink to perform first printing; printing an insulating layer 14 on the antenna pattern 13 to thus perform second printing; printing an internal terminal connected to an internal end portion of the antenna pattern 13 and formed to pass over the insulating layer 14 to thus perform third printing; and attaching a shield film 16 for covering the antenna pattern 13.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery with a label film attached to a case, wherein
the label film includes a film base, an antenna pattern formed on a first side of the film base, and an information layer formed on a second side of the film base and on which a character including information on the rechargeable battery is written; wherein
the antenna pattern includes an antenna portion rotated and extended toward an internal side from an external side, an external terminal connected to an external end of the antenna portion, and an internal terminal connected to an internal end of the antenna portion.

2. The rechargeable battery of claim 1, wherein
the second side is attached to the case and contacts the case.

3. The rechargeable battery of claim 1, wherein
the antenna pattern is made of a conductive ink formed by printing.

4. The rechargeable battery of claim 1, wherein
an insulating layer is formed between the internal terminal and the antenna portion.

5. The rechargeable battery of claim 1, wherein
a shield film made of ferrite is attached to the antenna pattern, and the internal terminal and the external terminal are exposed outside the shield film.

6. The rechargeable battery of claim 1, wherein
an access terminal connected to the antenna pattern is formed on an external side of the case.

7. The rechargeable battery of claim 1, wherein
the internal terminal and the external terminal are connected to the access terminal with a conductive adhesive as a medium.

8. The rechargeable battery of claim 1, wherein
the antenna pattern is used as a near field communication (NFC) antenna.

9. A method for manufacturing a rechargeable battery with a label film, comprising:
printing an antenna pattern on a first side of a film base by using a conductive ink to perform a first printing;
printing an insulating layer on the antenna pattern to perform a second printing;

printing an internal terminal connected to an internal end portion of the antenna pattern and formed to pass over the insulating layer to perform a third printing;

attaching a shield film for covering the antenna pattern; and attaching the label film to a case to attach the case.

10. The method of claim 9, wherein
the first printing includes printing an antenna portion wound toward an internal side from an external side and an external terminal connected to an external end of the antenna portion.

11. The method of claim 10, wherein
the attaching of a case includes electrically connecting the external terminal and the internal terminal to an access terminal formed on an external side of the case.

12. The method of claim 11, wherein
the first printing, the second printing, and the third printing are performed according to a rotary printing scheme.

13. The method of claim 11, further comprising
printing an information layer on which a character including information on a rechargeable battery is written on a second side of the film base to print information.

14. A method for manufacturing a label film attached to a case of a rechargeable battery comprising:
printing an antenna pattern on a first side of a film base by using a conductive ink to perform a first printing;
printing an insulating layer on the antenna pattern to perform a second printing;
printing an internal terminal connected to an internal end portion of the antenna pattern and formed to pass over the insulating layer to perform a third printing; and
attaching a shield film for covering the antenna pattern.

15. The method of claim 14, further comprising
printing an information layer on which a character including information on a rechargeable battery is written on a second side of the film base.

* * * * *